United States Patent
Shen

(10) Patent No.: US 6,282,247 B1
(45) Date of Patent: *Aug. 28, 2001

(54) METHOD AND APPARATUS FOR DIGITAL COMPENSATION OF RADIO DISTORTION OVER A WIDE RANGE OF TEMPERATURES

(75) Inventor: Qun Shen, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 08/928,637

(22) Filed: Sep. 12, 1997

(51) Int. Cl.[7] .................................. H04B 15/00
(52) U.S. Cl. .................. 375/285; 375/296; 375/297; 455/126; 381/1
(58) Field of Search .......................... 375/285, 254, 375/296, 297, 278, 284, 346, 350, 232, 233; 455/63, 296, 307, 310, 311, 312; 381/1, 71

(56) References Cited

U.S. PATENT DOCUMENTS

| | | | |
|---|---|---|---|
| 4,890,300 | * 12/1989 | Andrews | 375/297 |
| 4,967,164 | * 10/1990 | Sari | 330/149 |
| 5,107,520 | * 4/1992 | Karam et al. | 375/296 |
| 5,113,414 | * 5/1992 | Karam et al. | 375/296 |
| 5,123,031 | * 6/1992 | Kuisma | 375/296 |
| 5,361,156 | * 11/1994 | Pidgeon | 359/161 |
| 5,390,364 | * 2/1995 | Webster et al. | 455/506 |
| 5,396,190 | * 3/1995 | Murata | 330/149 |
| 5,404,378 | * 4/1995 | Kimura | 375/296 |
| 5,515,013 | * 5/1996 | McConnell | 332/124 |
| 5,574,990 | * 11/1996 | Flanagan | 455/115 |
| 5,604,468 | * 2/1997 | Gillig | 331/176 |
| 5,697,073 | * 12/1997 | Daniel et al. | 455/126 |
| 5,727,066 | * 3/1998 | Elliott et al. | 381/1 |
| 5,768,317 | * 6/1998 | Fague et al. | 375/296 |
| 5,854,605 | * 12/1998 | Gildea | 342/357 |
| 5,870,668 | * 2/1999 | Takano et al. | 455/126 |
| 5,903,823 | * 5/1999 | Moriyama et al. | 455/126 |

OTHER PUBLICATIONS

Personal Wireless Telecommunications Interoperability Standard (PWT), Part 2: Physical Layer, TIA/EIA 662–2.

* cited by examiner

Primary Examiner—Stephen Chin
Assistant Examiner—Shu Wang Liu
(74) Attorney, Agent, or Firm—Burns, Doane, Swecker & Mathis, L.L.P.

(57) ABSTRACT

Radio distortion in a radio signal is compensated for in a digital modem in a wireless communication system over a wide range of temperatures. Actual frequency responses of components in the wireless communication system contributing to distortion at various temperatures are determined. Inverses of the actual frequency responses are multiplied with a desired frequency response of the wireless communication system to produce compensation frequency responses for various temperatures. An appropriate compensation frequency response for an operating temperature is applied to the radio signal to compensate for radio distortion. Alternately, actual impulse responses of components in the wireless communication system contributing to distortion at the various temperatures are determined. The actual impulse responses are convolved with a reference signal to produce actual output signals. The desired impulse response is convolved with the same reference signal to produce a desired output signal. The actual output signals are subtracted from the desired output signal to produce error signals, and adaptive algorithms are applied to the error signals to produce adaptive compensation impulse responses. When an appropriate adaptive compensation impulse response for the operating temperature converges to an optimal solution, it is applied to the radio signal to compensate for radio distortion.

32 Claims, 6 Drawing Sheets

METHOD AND APPARATUS FOR DIGITAL COMPENSATION OF RADIO DISTORTION OVER A WIDE RANGE OF TEMPERATURES

CROSS REFERENCE TO RELATED APPLICATIONS

The present application is related to a patent application Ser. No. 08/879,701 entitled "Method and Apparatus for Digital Compensation of Radio Distortion in a Wireless Communication System" in the name of Qun Shen, filed on Jun. 20, 1997, and herein incorporated by reference.

FIELD OF THE INVENTION

The present invention relates generally to a digital signal processing method and apparatus for a wireless communication system. More particularly, the present invention relates to a method and apparatus for digitally compensating for radio distortion over a wide range of temperatures.

BACKGROUND OF THE INVENTION

In any wireless communication system, various distortions are generated during signal transmission and reception. Such distortions may be caused by various components in the reception and transmission paths or by the radio-air interface. These distortions can significantly degrade communication system performance if not properly compensated.

FIG. 1 illustrates a typical wireless communication system. A signal to be transmitted is encoded in a Source Encoder 100 and a Channel Encoder 200, then modulated in a Digital Modulator 300. The encoded signal can be modulated according to any known modulation technique. For example, in the Personal Wireless Telecommunications Interoperability Standard (PWT), as described in Part 2: Physical Layer, TIA/EIA 662-2, a signal is π/4 Differential Quadrature Phase Shift Keyed (DQPSK) modulated. The Digital Modulator 300 is typically implemented in a digital circuitry. The modulated signal is then passed through a Transmission Channel 400 before being transmitted through the air via an Antenna 500. A series of bandpass filters are typically employed in the Transmission Channel 400 to assure that the signal to be transmitted is confined within a pre-defined frequency band with appropriate transmit characteristics.

The transmitted signal is received at an Antenna 600, processed through a Receiving Channel 700, which has similar circuitry as the Transmission Channel 400, demodulated in a Digital Demodulator 800, and decoded in a Channel Decoder 900 and a Source Decoder 1000. Ideally, the output from the Source Decoder 1000 is the same as the input to the Source Encoder 100.

FIG. 2 illustrates a detailed block diagram of the Transmission Channel 400. As shown in FIG. 2, the Transmission Channel 400 includes a D/A Intermediate Frequency (IF) Bandpass Filters 420 and 440, Mixers 430 and 450, and a Radio Frequency (RF) Front End 460. The IF Filters 420 and 440 confine the signal to a particular frequency band, the Mixers 430 and 450 up convert the baseband modulated signal to an intermediate frequency, and the RF Front End 460 converts the up converted signal to a radio frequency. The IF Filter 420 is typically an interstage filter that is centered, for example, at 11.25 MHZ, and the IF Filter 440 is typically a SAW filter that is centered, for example, at 422.5 MHZ.

The IF Filters 420 and 440 are typically designed with analog components or surface acoustic wave technology. Due to their analog nature, the IF Filters 420 and 440 often produce imperfect frequency responses which cause channel distortion. The channel distortion degrades the quality of the transmitted signal.

Reducing channel distortion to a reasonable level has always been a great challenge in wireless communication system design. Traditionally, the problem of radio channel distortion has been solved by simply putting more restrictive requirements on the analog filter design in the transmission channel. However, the design of a perfect analog filter that meets radio transmission requirements can be technically difficult. This often results in more expensive components and a longer design cycle. It is often not feasible to obtain an optimal analog filter design due to cost and time constraints.

Digital compensation provides an attractive alternative. For example, the Digital Cordless Telephone (DCT) 1900 modem includes a digital compensation filter. However, this filter is primarily concerned with compensating distortion due to signal digitization.

The problem of channel distortion is aggravated by the fact that components of the transmission system, such as the IF Filters 420 and 440, are typically temperature sensitive. That is, the frequency responses of these filters vary when the temperature in which the filters operate fluctuates. In wireless communication applications, systems are expected to perform in a wide range of temperatures. Base stations, for example, often operate in an outdoor environment or other environment in which the temperature is not controlled for personal comfort. In such an environment, the temperature variation over time can be quite substantial. For example, according to the Personal Wireless Telecommunications (PWT) Interoperability Standard, the class E2 temperature requirements for fixed parts (FP), radio fixed parts (RFP), and central control fixed parts (CCFP) is between −10° C. and 55° C. Other standards, such as IS136 and IS95, have similar requirements for system operation temperature. To assure optimal system performance, radio distortion should, preferably, be compensated over a wide range of temperatures.

Correcting temperature dependent radio distortion by analog means is simply too expensive to be a practical solution in commercial wireless communication applications. Conventional filtering techniques do not provide a practical means by which distortion can be compensated for over a wide range of temperatures.

It would be desirable to provide a digital compensation filter for a wireless communication system which compensates for radio distortion over a wide range of temperatures without requiring additional hardware.

SUMMARY OF THE INVENTION present invention overcomes the above-described problems, and provides additional advantages, by providing a method and apparatus for digitally compensating for temperature dependent radio channel distortion over a wide range of temperatures in a wireless communication system. According to an exemplary embodiment of the present invention, digital compensation is performed in digital modem ASIC circuitry in the wireless communication system.

According to a first embodiment, actual frequency responses of components in the wireless communication system contributing to distortion at various temperatures are determined. The inverses of the actual frequency responses at the various temperatures are multiplied with a desired frequency response of the wireless communication system to produce compensation frequency responses. An appropriate compensation frequency response for the operating temperature is applied to the radio signal to compensate for radio distortion.

According to a second embodiment, the actual impulse responses of components in the wireless communication system contributing to distortion at the various temperatures are determined and convolved with a reference signal to produce actual output signals. A desired system impulse response is convolved with the same reference signal to produce a desired output signal. The actual output signals are subtracted from the desired output signal to produce error signals for the various temperatures. Adaptive algorithms are applied to the error signals to produce adaptive compensation impulse responses for the various temperatures. The adaptive compensation impulse responses are convolved with the reference signal and the actual impulse responses to produce updated actual output signals, and the updated actual output signals are subtracted from the desired output signal to produce updated error signals. The adaptive algorithms are applied to the updated error signals to form updated adaptive compensation impulse responses. The adaptive compensation impulse responses are updated, the updated adaptive compensation impulse responses are convolved with the actual impulse responses and the reference signal to produce updated output signals, and the updated actual output signals are subtracted from the desired output signal to produce the updated error signals until the adaptive compensation impulse responses converge to optimal solutions. Then, an appropriate adaptive compensation impulse response for the operating temperature is applied to the radio signal to compensate for radio distortion.

BRIEF DESCRIPTION OF THE DRAWINGS

A more complete understanding of the present invention can be obtained upon reading the following Detailed Description of the Preferred Embodiments, in conjunction with the accompanying drawings, in which like reference numbers are used to designate like elements, and in which.

DETAILED DESCRIPTION OF THE PREFERRED EMBODIMENTS

According to the present invention, a digital compensation method and apparatus are provided in a digital modem for compensating for temperature dependent radio distortion in a radio signal in a wireless communication system. According to exemplary embodiments, temperature dependent distortion caused by filters in the transmission channel in the communication system is digitally compensated for by a digital compensation filter.

According to the present invention, a series of digital filters compensates for radio distortion in a radio signal over a wide range of temperatures. Assuming that the radio system operates between temperatures $T_{min}$ and $T_{max}$, then according to the PWT standard:

$$-10° \text{C.}=T_{min} \leq T \leq T_{max}=55° \text{C.} \quad (1)$$

where T represents an operating temperature of the radio transmission system.

To assure proper compensation of the radio distortion, channel estimation is performed. This is typically done by measuring the frequency responses of the radio components to be compensated. To make compensation applicable to a wide range of temperatures, channel frequency responses are estimated at various temperatures. Accurate estimation is important in quantifying the variation of the frequency responses versus temperature and assuring compensation performance.

For convenience, the system operating temperature T can be divided into N subsets, i.e., $$T_{min} + \sum_{n=1}^{N} \Delta T_n = T_{max} \quad (2)$$

where $$\Delta T_n = T_{n+1} - T_n \quad (3)$$

Within each temperature subset, the frequency response variation is small enough such that the same digital filter adequately compensates the distortion. Different amounts of compensation are needed for individual temperature subsets. Therefore, N sets of digital filter coefficients are used for the temperature range of $T_{min} \leq T \leq T_{max}$. N and $\Delta T_n$ can be determined based on design requirements and performance specifications.

Figure 1:
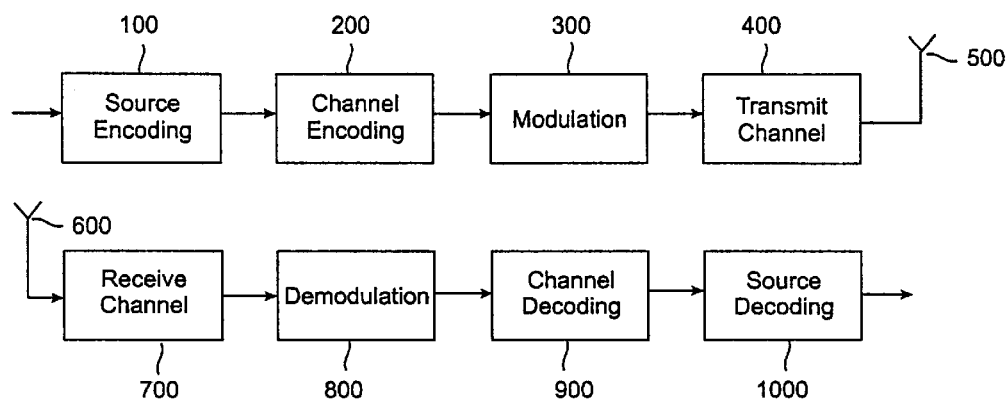
FIG. 1 illustrates a block diagram of a typical wireless communication system.
Figure 2:
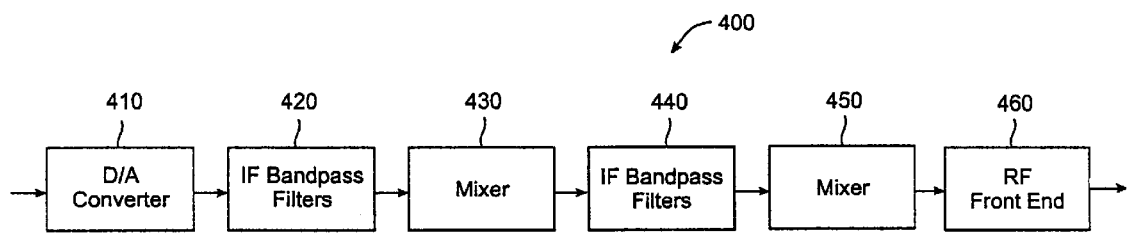
FIG. 2 illustrates a detailed block diagram of a radio transmission channel.
Figure 3A:
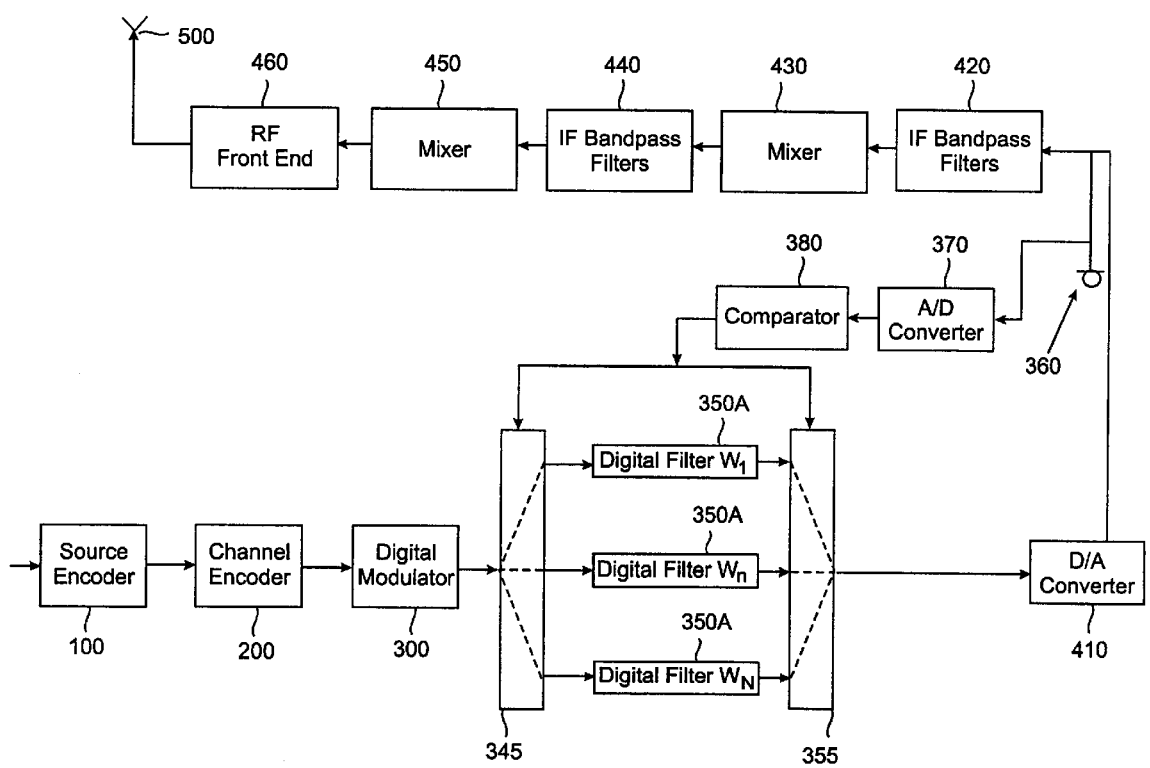
FIGS. 3A and 3B illustrate exemplary radio transmission systems employing digital compensation over a wide range of temperatures according to the present invention.
Figure 3B:
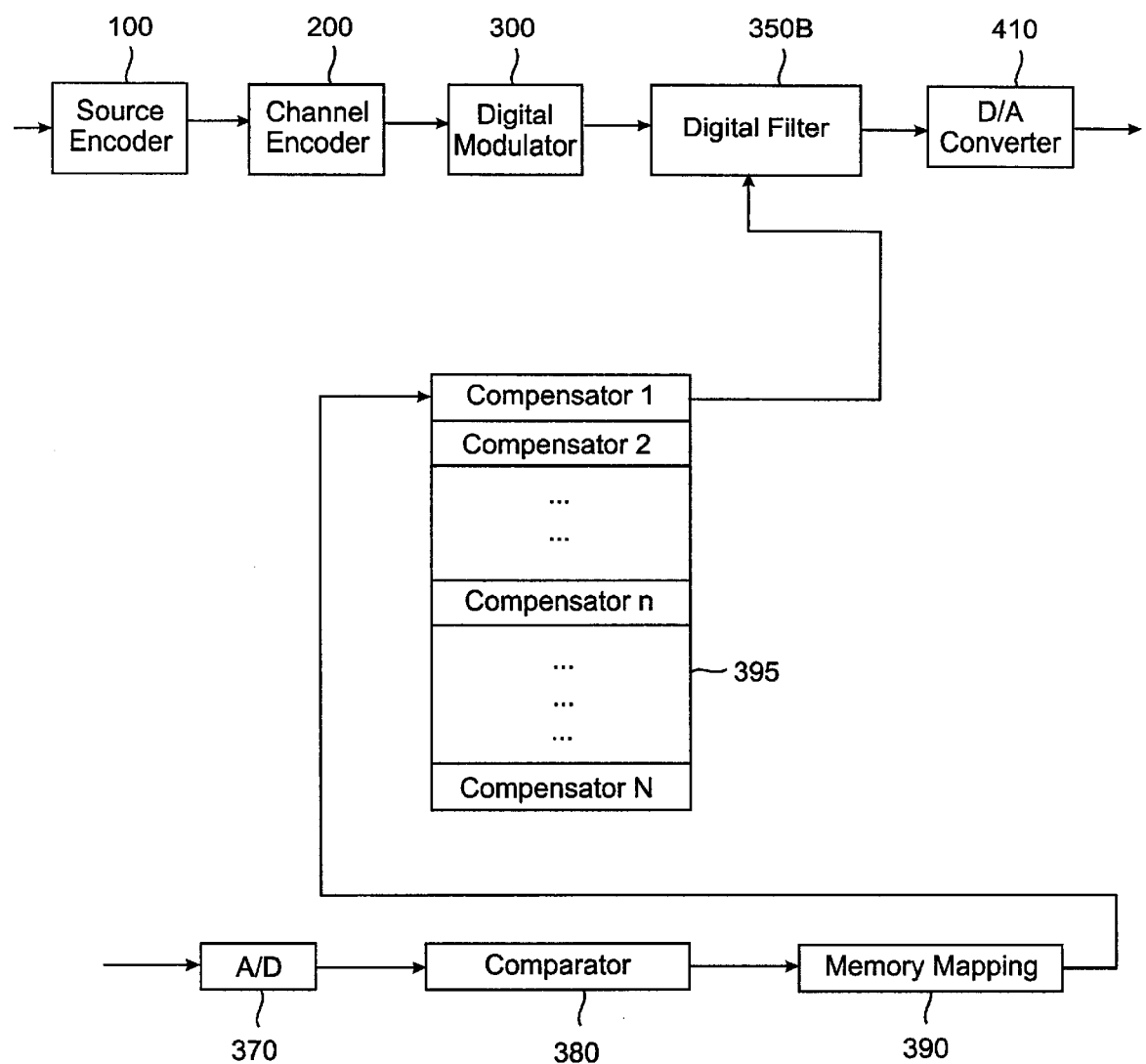

FIGS. 3A and 3B illustrate exemplary radio transmission systems employing digital compensation according to the present invention. In FIG. 3A, digital compensation is implemented by hardware, and in FIG. 3B digital compensation is implemented with software.

Referring to FIG. 3A, N Digital Filters 350A are included in the radio transmission system between Multiplexers 345 and 355. The Multiplexer 345 is arranged between the Digital Modulator 300 and the Digital Filters 350A, and the Multiplexer 355 is arranged between the Digital Filters 350A and the D/A Converter 410. Although shown as separate devices, the Digital Filters 350A and the Multiplexers 345 and 355 can be included in the Digital Modulator 300.

There are N sets of filter coefficients, $w_1, w_n, \ldots, w_N$, one set for each subset of the temperature range. Each of the N Digital Filters 350A has a set filter coefficients corresponding to a particular subset of the temperature range.

A thermal sensing device 360 is used to detect the radio transmission system operating temperature. The thermal sensing device 360 linearly converts a temperature measurement to a voltage signal. Any conventional thermal sensing device can be used. For example, a conventional thermal sensor existing in a base station or handset can be conveniently used.

In the DCT 1900 Freeset portable part, for example, the sensed temperature signal is converted to a digital signal through an A/D Converter 370. The signal can be, for example, stored in a memory and accessed by a burst mode controller (BMC) (not shown).

A Comparator 380 compares the temperature signal against N-1 predetermined thresholds and determines which temperature threshold the temperature signal is closest to, i.e., which temperature subset out of the N subsets the sensed temperature signal falls within. The Comparator 380 outputs a signal to the Multiplexers 345 and 355 corresponding to that temperature subset, and the Multiplexers 345 and 355 select a Digital Filter 350A having the appropriate filter coefficients. The input signal is then passed through the selected Digital Filter 350A. The comparator logic can be designed such that the selection is prohibited during active transmissions.

FIG. 3B shows an alternate compensator implementation employing software, without requiring a hardware modification or additional hardware resources other than that already existing in a digital modem. For simplicity of illustration, portions of the transmission system have been omitted from FIG. 3B.

In FIG. 3B, a set of default filter coefficients can be preloaded into hardware registers in the Digital Filter 350B. The default filter coefficients can be selected to compensate for a default temperature, e.g., room temperature. Filter coefficients that compensate for distortion at different temperatures are stored in the Compensator Memory 395 which can be implemented, for example, with a flash memory or an EEPROM.

There are N sets of filter coefficients $w_1, w_2, \ldots w_n, \ldots w_N$, each of which is stored in a specified address in the Compensator Memory 395. The sensed temperature signal from the temperature sensing device 360 is converted by the A/D Converter 370 into a digital signal. The temperature signal is compared with the temperature threshold values in the Comparator 380. Whenever a substantial temperature variation is detected, the Memory Mapping Device 390 locates the address of the appropriate set of filter coefficients in the Compensation Memory 395, i.e. the set of filter coefficients corresponding to the temperature subset which the temperature signal falls within. This set of filter coefficients is downloaded from the Compensation Memory 395 into the Digital Filter 350B, replacing the default values. In order not to interfere with or interrupt normal communications, the set of filter coefficients can be loaded in the empty transmission slots which are available in both base station and handset transmissions.

In addition to storing frequency responses of the radio channel, the system can also be calibrated under different temperatures. When the temperature changes, appropriate calibrated values such as gains for different radio devices associated with that temperature can then be used.

According to a first embodiment of the present invention, radio distortion is digitally compensated for by applying a compensation frequency response, which is derived through multiplying a desired system frequency response with a matrix inversion of an actual system frequency response, to the radio signal.

Figure 4:
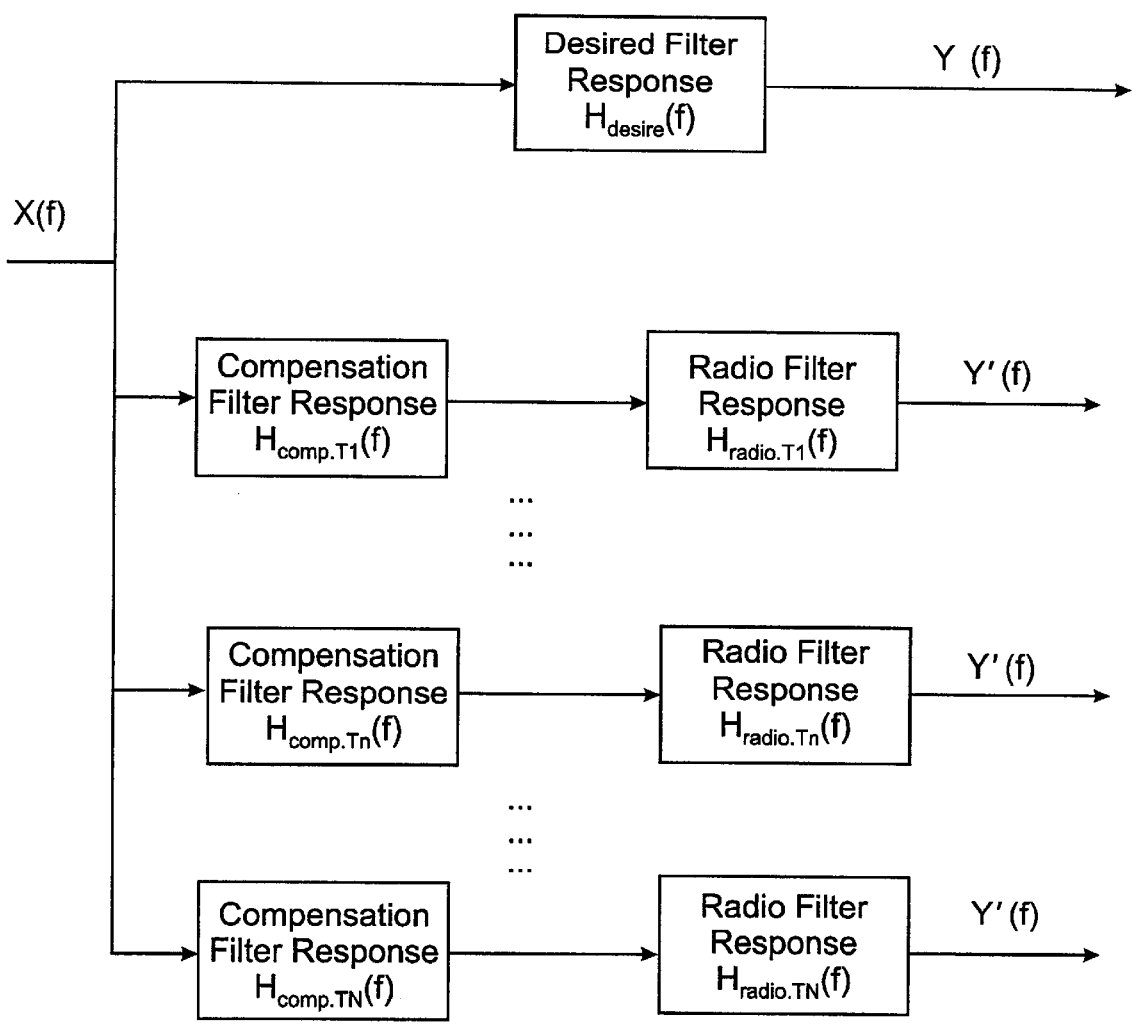
FIG. 4 illustrates a digital compensation technique using an inverse of an actual frequency response according to a first embodiment of the present invention.

FIG. 4 illustrates a technique for digital compensation according to the first embodiment. Referring to FIG. 4, ideally the actual output, Y'(f), with compensation applied at various temperatures to the reference signal X(f), is the same as the desired output, Y(f), of the reference signal X(f). Actual frequency responses for various temperatures, a desired frequency response, and compensation frequency responses for various temperatures are represented in FIG. 4 as $H_{radio,T1}(f), \ldots H_{radio,Tn}(f), \ldots H_{radio,TN}(f), H_{desire}(f)$, and $H_{comp,T1}(f), \ldots H_{comp,Tn}(f), \ldots H_{comp,TN}(f)$, respectively.

Assuming that the IF Filters 420 and 440 are the only components contributing to distortion, and their individual frequency responses at a given temperature $T_n$ are $H_{int,Tn}(f)$ and $H_{saw,Tn}(f)$, respectively, the actual frequency response at temperature $T_n$ is given as:

$$H_{radio,Tn}(f) = H_{int,Tn}(f) H_{saw,Tn}(f) \qquad (4)$$

Other radio components are assumed to have flat frequency responses without contributing any distortion. In equation (4), all frequency responses are expressed as complex diagonal matrices with the same frequency bandwidth.

More generally, $H_{radio,Tn}(f)$ may have the following form:

$$H_{radion,Tn}(f) = H_{1,Tn}(f) \ldots H_{n,Tn}(f) \ldots H_{N,Tn}(f) \qquad (5)$$

where N radio devices need to be compensated.

The actual frequency responses of individual system components can be measured using conventional measurement tools, e.g., a spectrum analyzer.

The desired transmitted frequency response, $H_{desire}(f)$, can be determined from the wireless communication system requirements. For example, according to the PWT standard, the desired system frequency response in the baseband is a root raise cosine filter response, i.e., $$|H_{desire}(f)| = \begin{cases} 1 & 0 < f < (1-\alpha)/2T \\ \sqrt{1/2(1 - \sin[(2\pi fT - \pi)/2\alpha])} & (1-\alpha)/2T \leq f < (1+\alpha)/2T \\ 0 & f \geq (1+\alpha)/2T \end{cases} \qquad (6)$$

with $\alpha=0.5$. According to the IS 136 Standard, $\alpha=0.35$.

From FIG. 4, it is evident that the following relationship should be maintained for imperfect radio characteristics to be properly compensated at a given temperature, $T_n$:

$$H_{comp,Tn}(f) H_{radio,Tn}(f) = H_{desire}(f) \qquad (7)$$

A possible solution for $H_{comp,Tn}(f)$ can be:

$$H_{comp,Tn}(f) = (H_{radio,Tn}^H(f) H_{radio,Tn}(f))^+ H_{radio,Tn}^H(f) H_{desire}(f) \qquad (8)$$

or $$H_{comp,Tn}(f) = H_{radio,Tn}^+(f) H_{desire}(f) \qquad (9)$$

where $H^H{}_{radio,Tn}(f)$ is the Hermitian (complex conjugate transpose) of $H_{radio,Tn}(f)$, and '+' represents a pseudo-inverse operation. If $H_{radio,Tn}(f)$ is of full rank, equation (9) becomes:

$$H_{comp,Tn}(f) = H_{radio,Tn}^{-1}(f) H_{desire}(f) \qquad (10)$$

According to the first embodiment, the filter coefficients of the digital compensation filter can be obtained from the compensation frequency response $H_{comp,Tn}(f)$. An input radio signal is filtered through the digital compensation filter to reduce distortion.

According to a second embodiment of the present invention, radio distortion is digitally compensated for by employing an adaptive filtering technique in which a gradient descent algorithm is used to obtain an adaptive compensation impulse response while minimizing a cost function.

Figure 5:
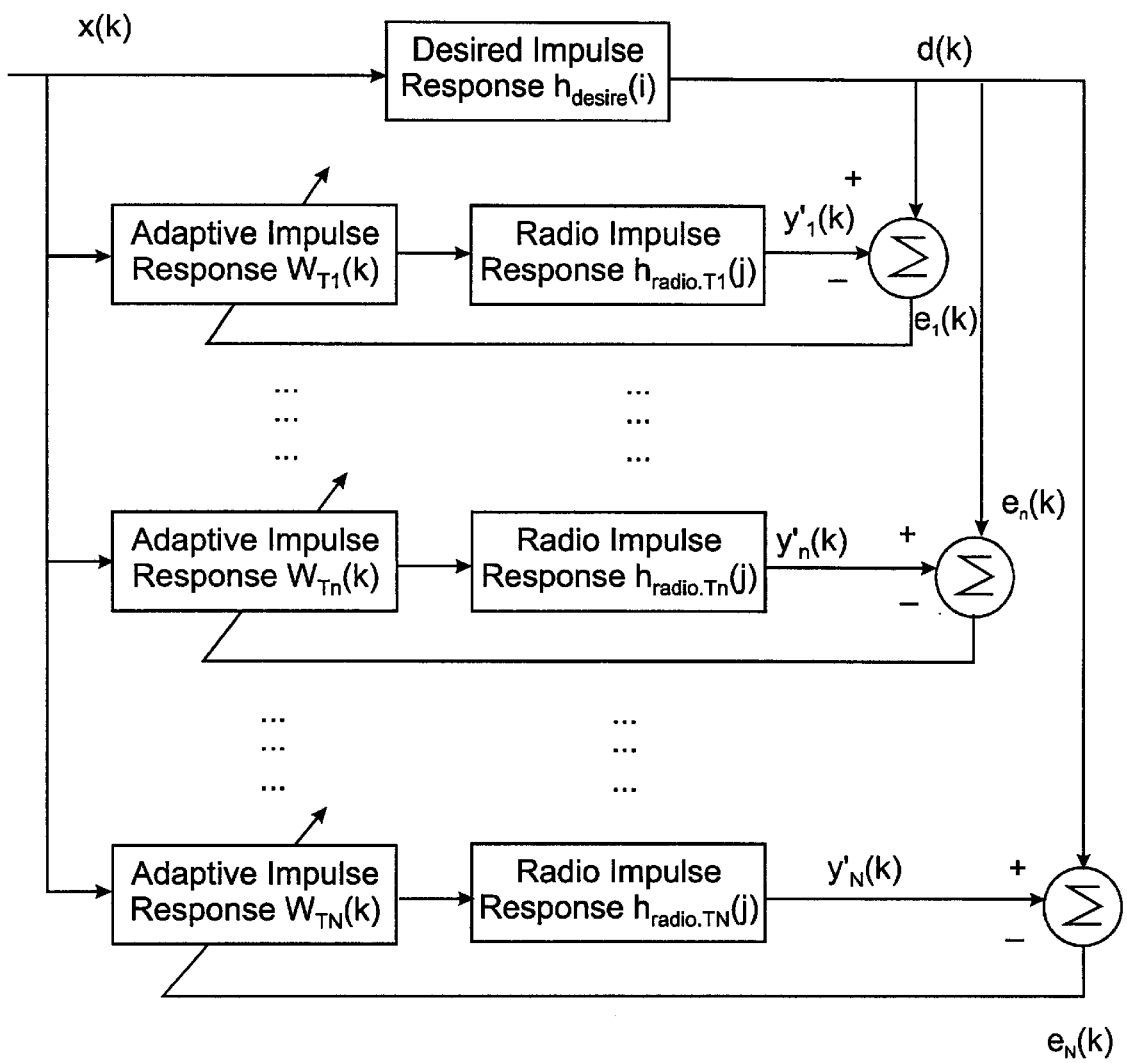
FIG. 5 illustrates a digital compensation technique using an adaptive algorithm according to a second embodiment of the present invention.

FIG. 5 illustrates a technique for digital compensation using an adaptive algorithm according to the second embodiment of the present invention. Referring to FIG. 5, $h_{desire}(i)$, where i=0,1,2 . . . I−1, and $h_{radio,Tn}(j)$, where j=0,1,2, . . . J−1, represent the desired system impulse response and the actual system impulse response at a given temperature, Tn, respectively. "I" and "J" represent the number of taps of $h_{desire}(i)$ and $h_{radio,Tn}(j)$. For convenience, I is assumed to equal J. The desired system impulse response, $h_{desire}(i)$, and the actual system impulse response, $h_{radio,Tn}(j)$ can be obtained from the desired system frequency response, $H_{desire}(f)$, and the actual system frequency response, $H_{radio,Tn}(f)$, respectively, by applying an inverse-Z transform. Alternately, $h_{desire}(i)$ can be determined from the wireless communication system requirements. Also, $h_{radio,Tn}(j)$ can be obtained by using conventional measurement tools, such as a spectrum analyzer and a network analyzer, to measure the actual impulse response of individual components in the system contributing to distortion and then convolving the individual actual impulse responses.

An adaptive algorithm is used to form the adaptive compensation impulse response. As shown in FIG. 5, the adaptive compensation impulse response $w_{Tn}(k)$ of an nth digital compensation filter is applied to the radio signal to compensate for distortion.

The cost function of the n-th adaptive filter in the adaptive system is defined as:

$$J_n = E\{e^T_n(k)e_n(k)\} \quad (11)$$

where "E" is an expectation operator, "$T$" is a vector or matrix transpose operator, and "k" is a sample index with k=1,2,3, . . . The function $e_n(k)$ represents the error between the desired output signal $d_n(k)$ and the actual output signal $y'_n(k)$ at temperature $T_n$, i.e., $$e_n(k) = d_n(k) - y'_n(k) \quad (12)$$

where $$y'_n(k) = x(k) \otimes w_n(k) \otimes h_{radio,Tn}(j) \quad (13)$$

and $$d_n(k) = x(k) \otimes h_{desire}(i) \quad (14)$$

where $y'_n(k)$ and $d_n(k)$ represent the actual output and the desired output, respectively, at time index k, x(k) represents a reference sequence, for example a random sequence, and "$\otimes$" represents a convolution operation. The reference sequence x(k) is a vector having the same size as the vectors $w_n(k)$ and $h_{radio,Tn}(j)$. One skilled in the art will appreciate that equations (13) and (14) have been somewhat simplified for ease of explanation.

Preferably, an adaptive algorithm is selected to minimize the cost function of the adaptive system. Minimizing the cost function through the adaptive process causes the adaptive compensation impulse response to converge to an optimal solution. While various adaptive algorithms can be used, a least mean square (LMS) algorithm is described here.

Figure 6:
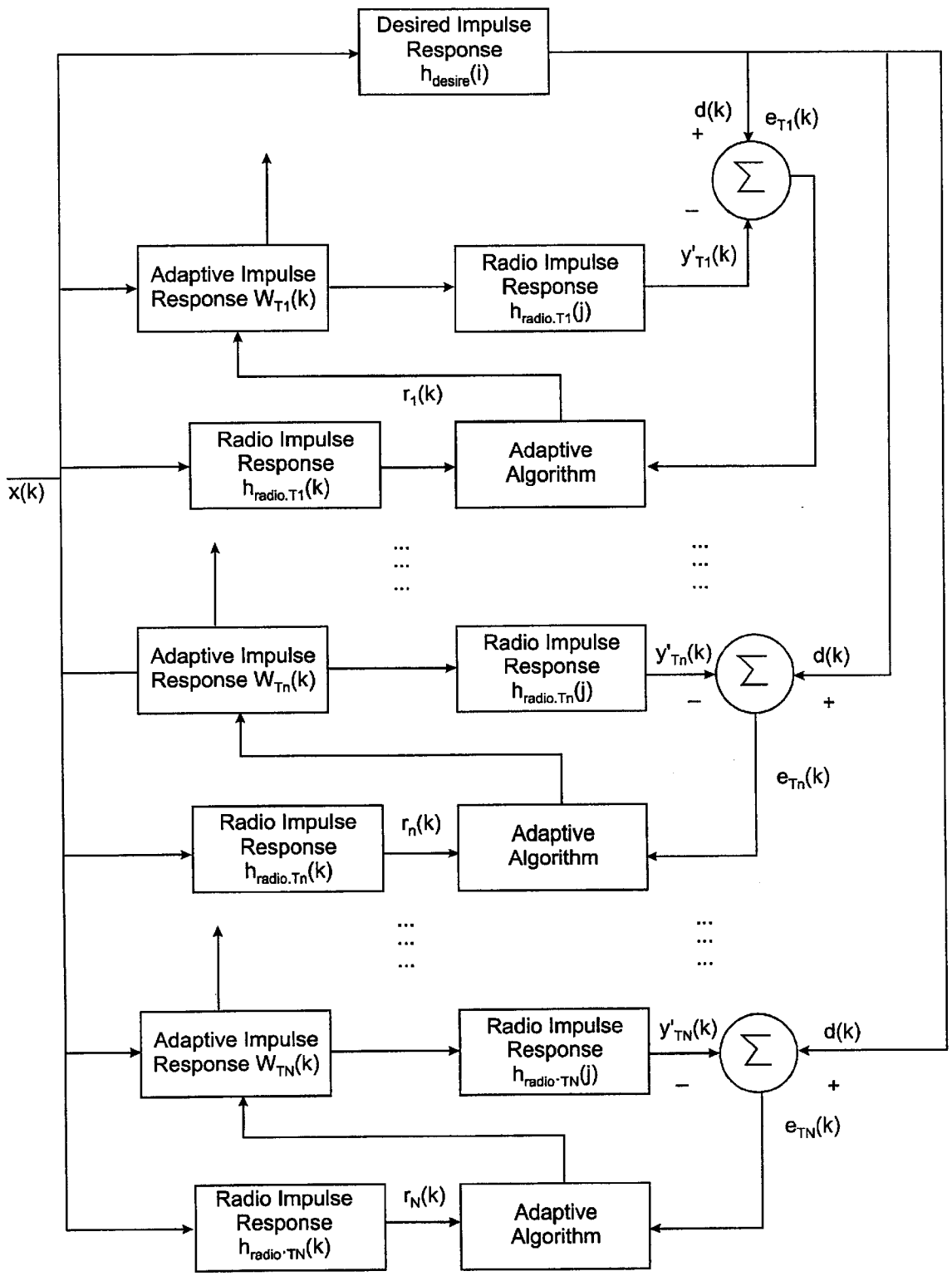
FIG. 6 illustrates an implementation of the digital compensation technique illustrated in FIG. 5.

FIG. 6 illustrates an implementation of the adaptive system shown in FIG. 5. Referring to FIG. 6, the adaptive compensation impulse response can be obtained by the following updating equation:

$$w_n(k+1) = w_n(k) - \mu_n \nabla_n(k) \quad (15)$$

where $\mu_n$ is a convergence parameter that determines the stability and convergence speed of an adaptive process, and $\nabla_n(k)$ is an instantaneous gradient estimate of the cost function $J_n$ with respect to adaptive compensation impulse response, i.e., $$\nabla_n(k) = \frac{\partial e^{2}_n(k)}{\partial w_n(k)} = 2e_n(k)\frac{\partial e_n(k)}{\partial w_n(k)} = -2r^T_n(k)e_n(k) \quad (16)$$

The parameter $r^T_n(k)$ corresponds to the filtered input signal vector having the same dimensions as the adaptive compensation impulse response $w_n(k)$. Each component of $r^T_n(k)$ is a convolution of the reference sequence x(k) and the actual radio impulse response, $h_{radio,Tn}(j)$.

According to the second embodiment, the filter coefficients of the digital compensation filter can be obtained from the adaptive compensation impulse response $w_n(k)$ once it converges to an optimal solution. An input radio signal is filtered through the digital compensation filter to reduce distortion.

Although in FIGS. 5 and 6 the adaptive compensation impulse response is applied using a Finite Impulse Response (FIR) filter, the method according to this embodiment of the present invention can be employed with various filter types, including Infinite Impulse Response (IIR) filters and lattice filters.

Also, although the second embodiment has been described with reference applications in a time domain, the adaptive process may also be applicable in a frequency domain.

In summary, according to the present invention, a method and apparatus are provided for digital compensation which improve modulation accuracy and transmitted signal quality over a wide range of temperatures substantially. Without introducing additional analog components and modifying analog circuit designs, the present invention offers an attractive and cost effective solution for radio distortion compensation.

Although the methods described above are for low-tier PCS wireless communication applications, the same principle can be applied to cellular, satellite, and other digital communication systems and applications. Furthermore, although the embodiments above have been described with reference to compensating for distortion in a transmission path, the present invention is also applicable for compensating for distortion caused by other portions of a wireless communication system, such as the receiving path.

While the foregoing description includes numerous details and specificities, it is to be understood that these are for purposes of explanation only. Many modifications will be readily apparent to those of ordinary skill in the art which are clearly within the and scope of the invention, as defined by the following claims and their legal equivalents.

What is claimed is:

1. In a wireless communication system, a method of digitally compensating for radio distortion in a radio signal over a wide range of temperatures, the method comprising the steps of:

determining actual frequency responses of components in the system contributing to distortion at various temperatures;

multiplying inverses of the actual frequency responses with a desired system frequency response to produce compensation frequency responses for the various temperatures; and applying an appropriate compensation frequency response for an operating temperature to the radio signal.

2. The method of claim 1, wherein the radio distortion is caused by components in a transmission path.

3. The method of claim 1, further comprising a step of detecting the operating temperature.

4. The method of claim 1, further comprising the steps of storing the compensation frequency responses for various temperatures in a memory and downloading the appropriate compensation frequency response for the operating temperature.

5. The method of claim 1, further comprising the step of implementing compensation frequency responses for various temperatures in hardware components and selecting appropriate hardware components for the operating temperature.

6. In a wireless communication system, a method of digitally compensating for radio distortion in a radio signal over a wide range of temperatures, the method comprising the steps of:

determining actual impulse responses of components in the system contributing to distortion at various temperatures;

applying the actual impulse responses to a reference signal to produce actual output signals for the various temperatures;

applying a desired system impulse response to the reference signal to produce a desired output signal;

subtracting the actual output signals from the desired output signal to produce error signals for the various temperatures;

applying adaptive algorithms to the error signals to produce adaptive compensation impulse responses for the various temperatures; and applying an appropriate adaptive compensation impulse response for an operating temperature to the radio signal when the appropriate adaptive compensation impulse response converges to an optimal value.

7. The method of claim 6, wherein the radio distortion is caused by components in a transmission path.

8. The method of claim 6, further comprising a step of detecting the operating temperature.

9. The method of claim 6, further comprising the step of storing adaptive compensation impulse responses for various temperatures in a memory and downloading the appropriate adaptive compensation impulse response for the operating temperature.

10. The method of claim 6, further comprising the step of implementing adaptive compensation impulse responses for various temperatures in hardware components and selecting appropriate hardware components for the operating temperature.

11. In a wireless communication system, an apparatus for digitally compensating for radio distortion over a wide range of temperatures, the apparatus comprising:

a storage device for storing compensation frequency responses for various temperatures, the compensation frequency responses corresponding to multiplications of inverse actual frequency responses of components in the system contributing to distortion at various temperatures with a desired system frequency response; and a digital filter for applying an appropriate compensation frequency response for an operating temperature to the radio signal to compensate for the radio distortion.

12. The apparatus of claim 11, wherein the radio distortion is caused by components in a transmission path.

13. The apparatus of claim 11, further comprising a temperature detector for detecting the operating temperature.

14. The apparatus of claim 11, wherein the storage device comprises a memory, and the appropriate compensation frequency response for the operating temperature is downloaded from the memory into the digital filter.

15. The apparatus of claim 11, wherein the storage device comprises hardware components, and appropriate hardware components are selected for the operating temperature.

16. In a wireless communication system, an apparatus for digitally compensating for radio distortion over a wide range of temperatures, the apparatus comprising:

a storage device for storing adaptive compensation impulse responses for various temperatures, the adaptive compensation impulse responses corresponding to the application of adaptive algorithms to the differences between actual output signals produced by the applications of actual impulse responses of components in the system contributing to distortion at various temperatures to a reference signal and a desired output signal produced by the application of a desired system impulse response to the reference signal; and a digital filter for applying an appropriate adaptive compensation impulse responses for an operating temperature to the radio signal, when the appropriate adaptive compensation impulse response converges to an optimal solution.

17. The apparatus of claim 16, wherein the radio distortion is caused by components in the transmission path.

18. The apparatus of claim 16, further comprising a temperature detector for detecting the operating temperature.

19. The apparatus of claim 16, wherein the storage device comprises a memory, and the appropriate adaptive compensation impulse response for the operating temperature is downloaded from the memory into the digital filter.

20. The apparatus of claim 16, wherein the storage device comprises hardware components, and appropriate hardware components are selected for the operating temperature.

21. The method of claim 1, wherein the components are analog filters.

22. The method of claim 21, wherein the components are surface acoustic wave filters and/or electronic form filters.

23. The method of claim 1, wherein the method compensates for amplitude and phase distortion.

24. The method of claim 6, wherein the components are analog filters.

25. The method of claim 24, wherein the components are surface acoustic wave filters and/or electronic form filters.

26. The method of claim 6, wherein the method compensates for amplitude and phase distortion.

27. The apparatus of claim 11, wherein the components are analog filters.

28. The apparatus of claim 27, wherein the components are surface acoustic wave filters and/or electronic form filters.

29. The apparatus of claim 11, wherein the apparatus compensates for amplitude and phase distortion.

30. The apparatus of claim 16, wherein the components are analog filters.

31. The apparatus of claim 30, wherein the components are surface acoustic wave filters and/or electronic form filters.

32. The apparatus of claim 16, wherein the apparatus compensates for amplitude and phase distortion.

* * * * *